UNITED STATES PATENT OFFICE.

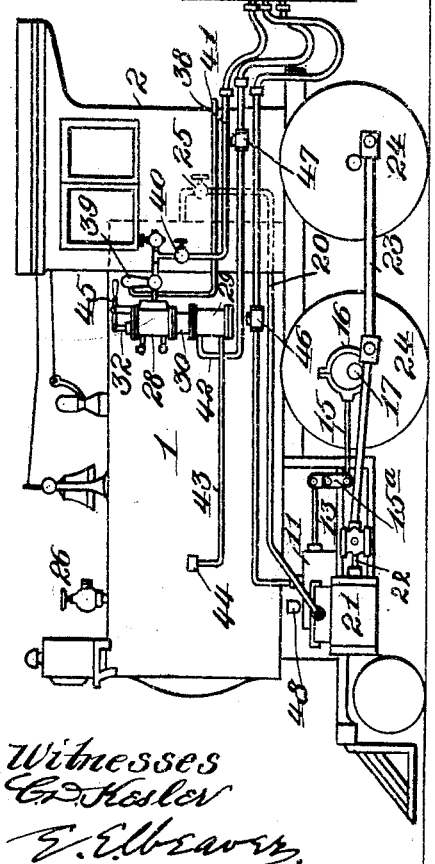

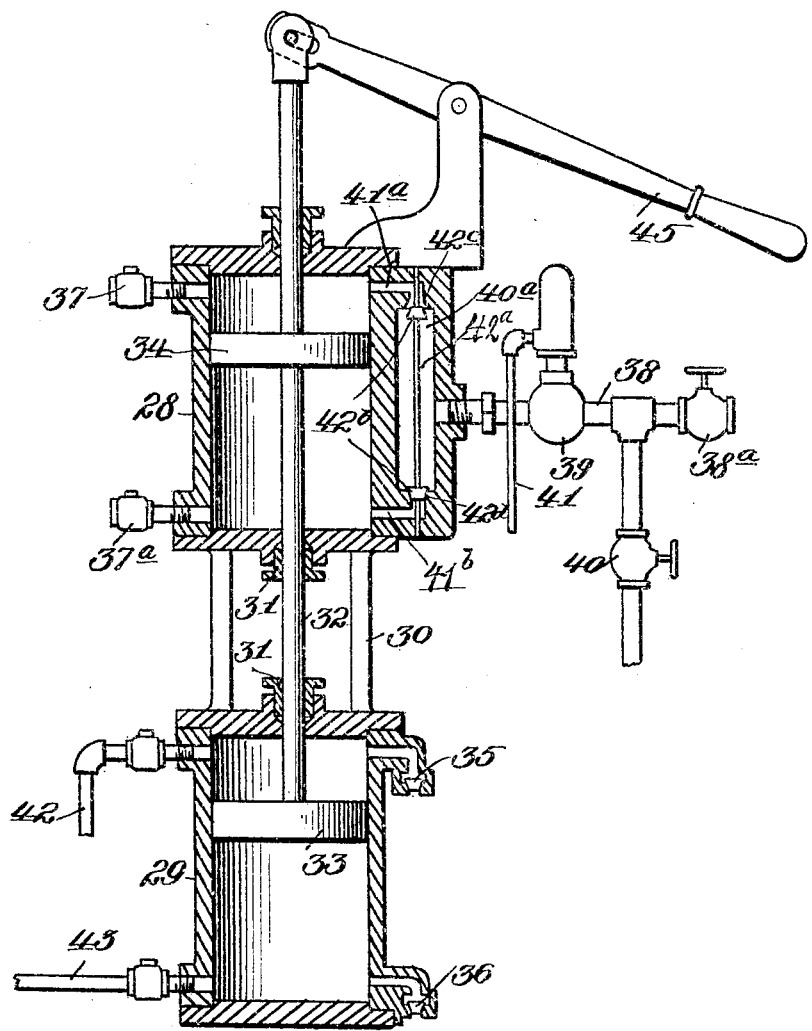

JAMES IRA PITTMAN AND ELIZABETH HARRISON, OF VALDOSTA, GEORGIA; SAID HARRISON ASSIGNOR TO SAID PITTMAN.

AIR MOTOR OR LOCOMOTIVE.

No. 931,643.　　　　Specification of Letters Patent.　　　　Patented Aug. 17, 1909.

Application filed May 7, 1906.　Serial No. 315,655.

*To all whom it may concern:*

Be it known that we, JAMES IRA PITTMAN and ELIZABETH HARRISON, citizens of the United States, residing at Valdosta, in the county of Lowndes and State of Georgia, have invented new and useful Improvements in Air Motors or Locomotives, of which the following is a specification.

This invention relates to air controlled motor devices such as locomotive and stationary engines, vehicles and other mechanical organizations which can be driven or operated by air under compression.

In the preferred application of the invention to locomotive engines, the latter are equipped with the usual wheel driving mechanism and cylinders with which the pumps coöperate, a portion of these pumps being actuated solely by the movable elements of the engine, and the remaining portion of the pumps being manually operative and used only to start the engine and connected to a receiving reservoir having communication by means of suitable pipes with storage reservoirs, and the storage reservoirs attached by conduits to a distributing reservoir simulating the usual boiler of a locomotive.

The course pursued in starting and stopping the engine or other motor device with which the invention is used will be more fully hereinafter specified, and in all applications of the invention the object sought is a material saving in the expense of running a locomotive or other motor, as no fuel is required loaded on and carried by the motor, and the mechanism ordinarily employed in connection with steam engines and other motors is reduced to a minimum in the present organization.

A further object is to maintain at all times within the distributing reservoir an effective air pressure for actuating the pistons, drive wheels, and other mechanisms.

In the drawings, Figure 1 is a side elevation of an air locomotive embodying the features of the invention. Fig. 2 is a top plan view of the locomotive. Fig. 3 is a detail transverse section, on an enlarged scale of one of the auxiliary pumping devices.

Similar numerals of reference are employed to indicate corresponding parts in the several views.

The numeral 1 designates a distributing reservoir simulating an ordinary locomotive boiler, but without the usual tubes and flues or other incidental attachments necessary in the control of steam production, conveyance, and storage. This reservoir will extend at its rear terminal into a suitable cab 2, and attached to the working organization of the engine is the usual form of tender 3, which, in this instance will serve not as a means for holding fuel, but as a support and convenient device for positioning a receiving reservoir 4 and storage reservoirs 5.

The storage reservoirs 5 are attached by pipes 6 and 7 to the distributing reservoir 1 and between the said storage reservoirs and the receiving reservoir 4 is a connecting T-pipe 8, having a valve 9 in one branch thereof. The receiving reservoir 4 also has a relief or exhaust valve 10, for a purpose which will be presently set forth. On opposite sides of the longitudinal center of the forward portion of the engine and under the forward portion of the distributing reservoir 1 are pumps 11, which have suitable pistons and piston rods 13 connected by link rods 15 and a rock shaft 15$^a$ to eccentrics 16 on one of the engine axles 17. The eccentric mechanism 16 operates the pumps, and the latter are of any preferred air pump construction, and are connected by pipes 18 and 19 to the receiving reservoir 4.

The distributing reservoir 1 has opposite pipes 20 extending from the rear thereof downwardly to cylinders 21, the latter having suitable piston rods 22 coöperating therewith and attached to drive rods 23, for actuating drive wheels 24 of the engine, this latter construction being similar to an ordinary locomotive engine. The feed of the air from the distributing reservoir 1 to the cylinders 21 is controlled by a throttle valve 25 of suitable nature and accessible within the cab 2. The distributing reservoir 1 is also supplied with an inlet valve 26 located at the upper portion thereof for attachment thereto of a tube or suitable connection from an air compressing mechanism that may be at a station or other supply point for initially charging the said reservoir with air to give the engine sufficient power or motive force to set the pumps in action. The reservoir 1 will have a large capacity in practice and a large volume of compressed air may be stored therein, this reservoir serving as a main generating means between specified points or interval stations where it will be replenished or resupplied with compressed air whenever found necessary. By the operation of parts hereinafter specified and particularly the pumps 11 some air will be forced back in the receiving reservoir 4 and from the latter flow into the storage reservoirs 5 which serve as feeders for the distributing reservoirs 1 when opened for communication with the said distributing reservoir. The pressure in the distributing reservoir 1, however, will always be materially greater or in excess of that required to operate the driving mechanism of the locomotive or engine and from time to time the said distributing reservoir will be replenished from the storage reservoirs 5 or at times when the quantity of compressed air in the distributing reservoir runs low and the engine is liable to stop before arriving at a station having a charging apparatus connectible with the said distributing reservoir.

In the operation of the motor, the compressed air is fed to the cylinders 21, which are entirely independent of the pumps 11 and have no connection with the latter, and through the operation of the pistons in the cylinders, which move alternately in opposite directions as in ordinary locomotive engines, the drive wheels 24 will be actuated.

In addition to the usual link motions and slide valves, the improved engine will include a signal device such as a whistle, if found necessary, or a bell operative from the cab, a head-light, and a fender or catcher.

After the engine is started, when less power is required to maintain the motion than was required to start it, the pumps will be thrown into service to compress air in the reservoirs 4 and 5, to be eventually supplied to reservoir 1, to compensate for the amount of air withdrawn in excess of present needs, but when a stop is made the valve 9 will be closed and the valve 10 opened to prevent the establishment of pressure between the receiving reservoir and the two storage reservoirs 5, and to liberate air from the reservoir 4, so that the latter may be clear for receiving air from the pumps 11, for instance after the engine is again started. In a case of emergency the hand pumps may be operated to charge the distributing reservoir through the receiving reservoir 4 and storage reservoirs 5, and when the hand pumps are operated the air that may be in the reservoir 4 at the time is liberated, so that the air may pass from the hand pumps into the reservoir 4 and from the latter into the reservoirs 5 and then into the distributing reservoir, the hand pumps being operated continuously until sufficient air has been compressed in the distributing reservoir to actuate the driving mechanism including the pumps 11. All the reservoirs will be of such resistance, structurally, as to adapt them to receive air under pressure considerably in excess of that required to operate the locomotive, and thus avoid any tendency to expand or injury to the operator due to explosion. All of the reservoirs will be provided with suitable gages by which the amount of pressure within the several reservoirs may be readily ascertained.

It will be understood that the operation of the cylinders 21 and of the pumps 11 is entirely independent, or, in other words, the cylinders 21 are not the pumps, but separate organizations are used to pump the air, and have their pistons operated by the adjacent drive wheels through the medium of the eccentrics 16, connecting rods 15, and rocker arms or links 15$^a$.

When the engine is stopped by shutting off the air from the cylinders through the operation of the throttle or controlling valve 25, the receiving reservoir 4 is cut out from the storage reservoirs 5 to obviate any tendency to equilibrium of pressure in the several reservoirs, and when the receiving reservoir is cut out, as set forth, the relief or exhaust valve 10 thereof is opened to permit all the air contained in the receiving reservoir to escape. If the air was allowed to remain in the receiving reservoir 4 when the engine is stopped and communication be maintained between said receiving reservoir and the storage reservoirs, the receiving reservoir would not be in condition for further receiving air from the pumps 11, or in the case of emergency by the operation of the hand pumps on opposite sides of the engine adjacent to the forepart of the cab, and for this reason equilibrium of pressure in the reservoirs 4 and 5 must be obviated to avoid blocking the movement of the engine in starting the latter, and which would result if there was a resisting amount of air in the reservoir 4 to the introduction of any more air in the said reservoir when the engine is started. In starting the engine, the throttle or controlling valve 25 is opened, the valve 10 closed, and at a proper interval after the engine is in motion communication between the receiving and storage reservoirs is reëstablished, the engine when in motion operating the pumps 11 to force air backwardly into the receiving reservoir 4 under compression. When the engine is stopped and ready to start again the receiving reservoir will have no pressure on it and the engine will move off quickly as there will be no resistance to such motion but the draft strain of the train.

The initial charging of the engine with air may be accomplished, in a simplified manner, by attaching the inlet valve 26 to an air pumping means located at a station or other supply point and during such initial charging of the distributing reservoir the valve 25 will be closed. The pressure of the air thus initially stored in the reservoir 1 will have sufficient power or motive force to set the pumps in action when the valve 25 is opened, or to serve as a motive means until the engine is under headway and the air from the pumps 11 regularly forced back and compressed in the receiving reservoir 4, as before explained.

One of the most essential conditions precedent to the practical operation of the motor is the relative dimensions of the pumps 11 and cylinders 21 or the proportionate areas of the pistons of the pumps and cylinders. Care will be exercised in the construction of these pumps and cylinders from a standpoint of proportions or difference in areas to insure a replenishment of the compressed air within the distributing reservoir 1 through the actuation of the pumps in amount approximately equal to the amount of air fed from the said distributing reservoir to the cylinders or the exhaust of the compressed air from the distributing reservoir in excess of that required when the pumps are in service to maintain the motion of the motor and its load, the said pumps forcing the air backwardly into the auxiliary reservoir 4 and storage reservoirs 5 and from the latter into the distributing reservoir, as hereinbefore indicated. The motor pistons should have an area greater than that of the pump pistons by a difference sufficient to receive so much power from the distributing reservoir as is required to maintain the motion after it has been established under ordinary conditions. When the motor is getting under way the pumps are out of service or are working against a resistance not yet accumulated to its maximum. At this time the power applied in the motor cylinders is, to start with, a maximum due to the pressure in the distributing reservoir applied to the whole areas of the motor pistons. The net power applied is gradually reduced from this maximum to that due to the pressure in the distributing reservoir applied to the difference between the areas of the cylinder pistons and those of the pump pistons. In going up grade the pumps may be thrown out of service, if required, thus obtaining the maximum power again at this time. In going down grade, under conditions favorable to the action, the supply valve 25 may be closed, and the fall of the motor and its load may be utilized to operate the pumps to store compressed air, thus replenishing the supply of power. In cases of emergency or when it is found that the gages indicate a low pressure present in the several reservoirs, the hand pumps or the electrically operated pumps may be independently utilized for restoring the necessary pressure in the distributing reservoir.

The locomotive engine is also shown equipped with a hand or manually operated pump on each side which will be used independently of the air pumping devices located at stations or other points for initially charging the reservoir 1 or to otherwise replenish said reservoir if found necessary at any time during the operation of the engine. This auxiliary manually operative pump consists of an upper section 28 and a lower section 29, both sections being in the form of cylinders which are independent of each other and connected by an intermediate tubular union 30, provided with suitable stuffing boxes or glands 31, through which and the cylinders a piston rod 32 extends and has on its lower end a piston head 33 and on its upper portion a piston head 34. The lower cylinder 29 with the piston head 33 serves as a double acting pump and has upper and lower inlet valves 35 and 36. The upper cylinder and its piston 34 is also a double acting pump and has suitable inlet valves 37 and 37$^a$. Connected to an intermediate portion of the upper cylinder 28 is a pipe 38 having an exhaust valve 38$^a$ and a suitable governor 39 and a controlling valve 40. This pipe 38 extends rearwardly and is connected to the reservoir 4. The pipe 38 connects with a valve chamber 40$^a$ in a part of the wall of the section or cylinder 28, and said valve chamber has upper and lower passages 41$^a$ and 41$^b$ communicating with the upper and lower portions of the interior of said section or cylinder. Within this valve chamber is a slide stem 42$^a$, with valves 42$^b$ fixed thereon and operating to alternately open and close against seats 42$^c$ and 42$^d$. The upper part of the auxiliary pump, when the valve 40 is open, will be effective in storing air under pressure in the reservoir 4 during opposite strokes of the piston 34, but when the valve 40 is closed there will be no resistance to the operation of the lower piston 33 by reason of the escape of the air through the exhaust valve 38$^a$, the latter being opened under such conditions. The governor 39 may also have a train pipe 41 attached thereto and the upper part of this auxiliary pump under these conditions, or where the train pipe 41 is attached thereto, may be utilized in pumping air into the train line when the valve 40 is closed.

The lower piston 33 operates on both strokes, through the medium of the upper and lower inlet valves 35 and 36, to alternately draw in and force air outwardly under compression therefrom, a pipe 42 being connected to the upper part of the lower section or cylinder 29 and also to one end of the receiving reservoir 4. A second pipe 43 is connected to the lower portion of the section or cylinder 29 and to the main or distributing reservoir 1, said pipe having a suitable check-valve 44 therein to prevent the air stored in the reservoir 1 from passing back to the lower section or cylinder 29.

Through the medium of the pipe connections 42 and 43, both the distributing reservoir 1 and the receiving reservoir 4 will be supplied with air, and from the receiving reservoir, the air will pass to the storage or auxiliary reservoirs 5, and thus the locomotive will be initially prepared by the auxiliary pump set forth for starting operations and supplied with a pressure sufficient to overcome the tractive resistance of the locomotive and cars that may be attached thereto. The pistons 34 and 33 and the piston rod 32 are actuated by a hand lever 45, projecting rearwardly from the pump within easy reaching distance through the forward part of the cab.

In addition to the check valve 44, the other pipes between the pumps 11 and receiving reservoir 4 and between the manually operative pumps located immediately in advance of and close to the cab 2 will be provided with suitable check valves, as at 46 and 47 for preventing the air from passing down to the pumps when the pistons of the latter are moving backwardly to take thereinto new charges of air, and each of the pumps will have a distinct check valve 48 which will automatically open when the auxiliary reservoir 4 is cut out to permit the escape of the air from the pumps so that the latter may continue to operate until the filled reservoir 4 is relieved of a portion of the air compressed thereinto, or is free for storage of another charge of air therein by the said pumps, it being understood that the check valves 48 of the pumps will open only under excess pressure and not under normal conditions or when the receiving reservoir is thrown into communication with said pumps.

It will be understood that the pumps 11 will be constructed in all particulars similar to ordinary air pumps, and provided with suitable inlets and relief means, and in view of the use of the check valves 46 in the pipes 18 and 19 the air from the reservoir 4 cannot escape back to the pumps, and when liberated by the opening of the valve 10 will be forced to pass out through the said latter valve.

From the foregoing it will be seen that the locomotive is equipped with pumping means to meet various contingencies, and the same pumping mechanisms and reservoir devices may be equally well used in connection with other motors either of a stationary or movable type.

The proportions and dimensions of the several reservoirs may also be changed at will, as well as minor details of construction to adapt the improved locomotive or motor for various uses.

As a further effective auxiliary in the operation of the motor device hereinbefore explained, a storage battery comprising two battery sections 49 and 50 is disposed in the rear extremity of the tender of the motor or air locomotive and electrically connected. An electric motor 51 is connected to the battery section 50, and a generator 52 is electrically connected to the storage battery section 49. The motor 51 has a pitman bar or other analogous element 53 operatively attached thereto and also to an air pump 54, having communication with one of the storage reservoirs 5 through the medium of a valved pipe 55. A valved pipe 56 is connected to the remaining storage reservoir 5, and communicates with an air engine or motor 57, having a pitman bar or other analogous device 58 attached thereto and also to the generator 52. The generator 52, as before indicated, is electrically connected to the storage battery section 49. The function of the auxiliary apparatus just described is to start the air motor or locomotive without operating the hand pumps hereinbefore explained, and in the event that there is no air stored to start, the battery section 50 is connected to the electric motor 51, through the medium of a switch 59. The motor 51 is thus set in motion and the pitman bar 53 actuates the pump 54 to force air into the adjacent storage reservoir 5, it being understood that the valve in the pipe 55 will first be opened. This electrical auxiliary apparatus will always be ready for use or service, particularly if the hand pumps become disordered and it becomes necessary to recharge the distributing reservoir before a main charging station is reached or in case the pressure in the distributing reservoir runs so low as to be ineffective in propelling the locomotive.

Having thus described the invention, what is claimed, is:

1. In an air motor of the class described, a distributing reservoir adapted to be charged at intervals from air compressing stations, storage reservoirs connected to the distributing reservoir, a receiving reservoir having pipe connection with the storage reservoirs, the pipe connection being provided with cut-off and exhaust valves, driving mechanism including cylinders and pumps, tubular supply connections between the cylinders and distributing reservoir, tubular connections between the pumps and receiving and storage reservoirs, and hand pumps for charging the distributing reservoir in the event that the pressure in the latter runs low.

2. In an air motor of the class described, a distributing reservoir adapted to be charged at intervals from air compressing stations, storage reservoirs connected to the distributing reservoir, a receiving reservoir having pipe connection with the storage reservoirs, the pipe connection being provided with cut-off and exhaust valves, driving mechanism including cylinders and pumps, tubular supply connections between the cylinders and distributing reservoir, tubular connections between the pumps and receiving and storage reservoirs, and auxiliary electric motor means and pump devices connected to the storage reservoirs.

3. In an air motor of the class described, a distributing reservoir and means for charging and maintaining the necessary quantity of air under pressure in the distributing reservoir and including pump means actuated by the motor while traveling, and other pump means operable independently of the first named pump means, all the pump means being connected up to the distributing reservoir and that actuated by the traveling movement of the motor having a controllable exhaust coöperating therewith and which will permit the latter pump means to run without storage effect.

4. In a motor driven solely by compressed air, a distributing reservoir, means for charging and maintaining the necessary quantity of air under pressure in the distributing reservoir and including pump means actuated by the motor while traveling, cylinder means supplied with compressed air from the distributing reservoir and serving as the main driving means for the motor, and valve means controlling the relative supply and exhaust of the air.

5. In a motor driven solely by compressed air, a distributing reservoir, means for charging and maintaining the necessary quantity of air under pressure in the distributing reservoir and including pump means actuated by the motor while traveling, and driving mechanism for the motor including drive wheels and cylinder means, the cylinder means being supplied with air under pressure from the distributing reservoir to actuate the drive wheels, the pump means serving solely to establish air pressure within the reservoir.

In testimony whereof we have hereunto set our hands in presence of two subscribing witnesses.

JAMES IRA PITTMAN.
ELIZABETH HARRISON.

Witnesses:
    W. HAWKINS,
    T. C. GRIFFIN.